July 19, 1966     S. W. BAKER ETAL     3,261,479

MANIPULATING DEVICES

Filed Dec. 26, 1962

INVENTORS
Samuel W. Baker and
Edward M. Citron

*their attorneys*

United States Patent Office 3,261,479
Patented July 19, 1966

---

3,261,479
MANIPULATING DEVICES
Samuel W. Baker, New York, N.Y., and Edward M. Citron, 315 Frick Bldg., Pittsburgh, Pa.; said Baker assignor to said Citron
Filed Dec. 26, 1962, Ser. No. 247,187
1 Claim. (Cl. 214—1)

This invention relates to manipulating devices and particularly to devices for handling objects mechanically without the use of the hands. There are many instances where it is necessary or desirable to handle and manipulate an object without using the hands. For example, there are many instances in the field of radioactive elements where "hot" objects must be manipulated within a shielded vessel. Similarly in autoclaves, pressure vessels and the like there are instances where objects must be handled in controlled positions.

This invention provides a device which makes possible the handling and manipulation of objects within a vessel. In a preferred embodiment there is provided a shaft, right and left hand intersecting threads on one end of said shaft, a pair of cooperating nuts having right and left hand threads respectively conforming with the right and left hand threads on said shaft and mounted on said shaft, cooperating object engaging means on said nuts, means for rotating said shaft and means for holding said nuts against rotation while the shaft rotates whereby the nuts move toward each other on rotation of the shaft in one direction and away from each other on rotation of the shaft in the opposite direction. Means are preferably provided to permit the rotation of the position of the nuts on the shaft whereby the position of the object engaging means may be changed from one plane to another.

In the foregoing general statement of this invention there is set out certain objects, purposes and advantages of this invention; other objects, purposes and advantages of this invention will be apparent from the following description and the accompanying drawings in which, FIGURE 1 is an isometric view of a form of this invention;

Figure 1:
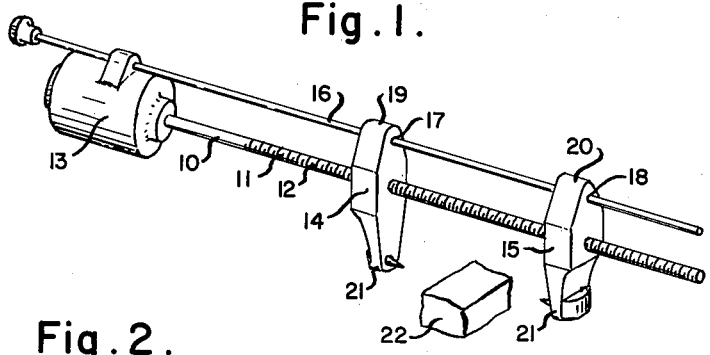

Referring to the drawings there is illustrated a shaft 10 having right 11 and left 12 hand intersecting threads. The shaft 10 is rotated by a motor 13 although any source of rotation may be used from a simple manual crank to complex drive systems. A right hand threaded nut 14 and a left hand threaded nut 15 are threaded onto the shaft 10. A guide rod 16 extends through openings 17 and 18 in bosses 19 and 20 on the nuts 14 and 15. The guide rod 16 is held onto the motor housing 13 to prevent rotation of nuts 14 and 15 with shaft 10. Pick up fingers 21 depend from nuts 14 and 15 and may be used to pick up objects 22.

Figure 2:
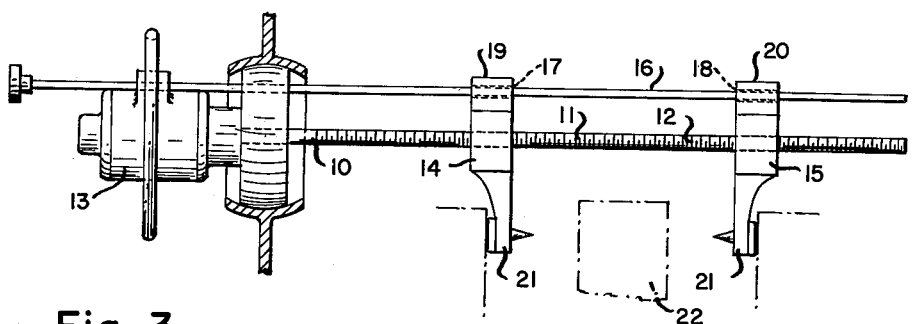
FIGURE 2 is a side elevation partly in section of the device of FIGURE 1.

The operation of the device of FIGURES 1 and 2 is as follows. The reversible motor 13 is held and when actuated will rotate the shaft 10 in one direction or the other. Rotation of the shaft in the clockwise direction, viewed from its free end causes the two nuts to move toward each other carrying pick-up fingers 21 toward object 22 to be picked up. Rotation in the counter clockwise direction moves the fingers 21 apart.

Figure 3:
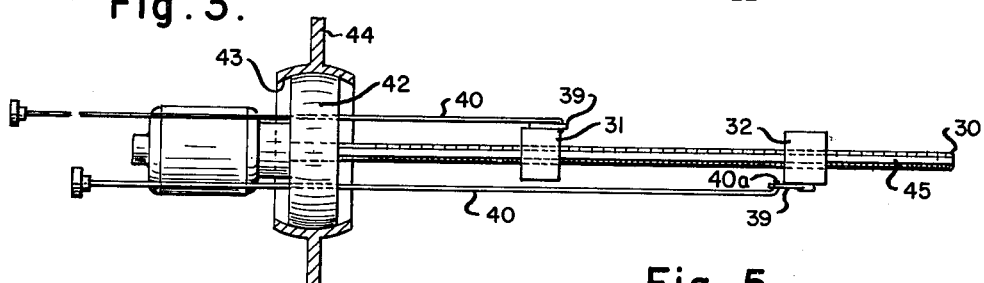
FIGURE 3 is a top plan view of a second embodiment of this invention.
Figure 4:
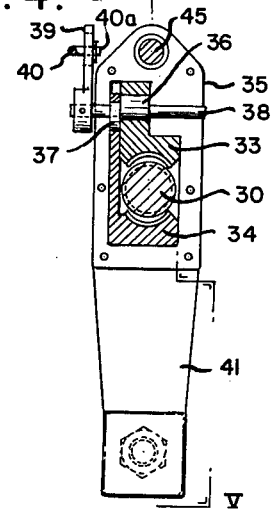
FIGURE 4 is a section on the line IV—IV of FIGURE 5.
Figure 5:
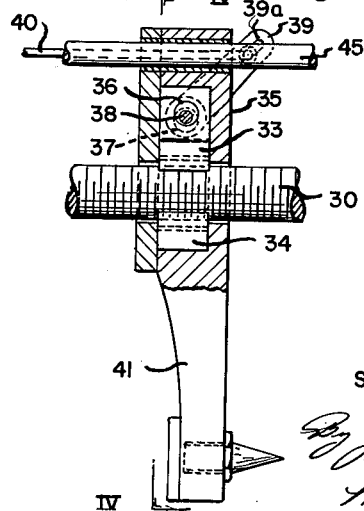
FIGURE 5 is a section on the line V—V of FIGURE 4.
Figure 6:
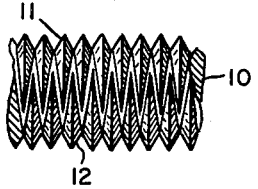
FIGURE 6 is a fragmental detailed view of the intersecting threads on shaft 30.

Referring to the embodiment illustrated in FIGURES 3–5, we have illustrated a shaft 30 having right and left hand threads as in the case of shaft 10 of FIGURE 1. A nut 31 having a right hand thread and a nut 32 having a left hand thread are threaded onto the shaft. Each nut 31 and 32 is formed of two movable segments 33 and 34 within housing 35. As shown more particularly in FIGS. 4 and 5, each housing 35 has mounted therein a cam shaft 38 extending transversely through the housing and journaled in the side walls thereof (see FIG. 4). Each said cam shaft 38 carries two cams 36 and 37 one of which (36) is journaled in the segment 33 of the respective nuts 31 and 32 while the other cam 37 on each shaft 38 is journaled in the other segment 34 of the respective nuts. The cams 36 and 37 are disposed on their respective shafts 38 in a manner to move the segments 33 and 34 of the respective nuts toward or away from the threaded shaft 30 when the cam shafts 38 are rocked or partially rotated. In order to operate the cam shafts 38 as described, each cam shaft is provided with a crank arm or shaft 38, a lever arm 39, each said crank arm arranged to be operated by a rod 40, which passes through the ball 42 and is mounted therein for longitudinal sliding movement. Each said rod 40 is provided with a terminal hook portion 40a engaged in a slot 39a provided in the respective crank arms 39, thus longitudinal movement of the respective rods 40 will rock the cam shafts 38 to selectively move segments 33 and 34 into and out of contact with the threads on shaft 30. Each of the housings 35 carries a depending pick-up finger 41. The shaft 30 is journaled in a torus 42 rotatable in a socket 43 in the wall 44 of a vessel. An operating rod 45 prevents rotation of the nuts as well as operating lever 39.

The operation of this device is as follows: When it is desired to change the operative position of the pick-up 41 the nuts 31 and 32 are run out until one is at the desired position, the lever 39 is actuated by rod 40 to open the nut that is in the proper position to be retained, the shaft 30 is then rotated in a direction to bring the other nut into proper position and the opened nut is then closed by operation of the proper control rod 40. The device is then in position to be operated to pick up an object.

In the foregoing specification certain preferred embodiments of this invention have been described. It will, however, be understood that the invention may be otherwise embodied within the scope of the following claim.

We claim:

In combination, a wall, a shaft journaled through said wall for universal movement about a point centrally of the journal in said wall, means acting on one end of said shaft for rotation thereof, right and left hand intersecting threads on the other end of said shaft, a pair of cooperating nuts having right and left hand threads respectively conforming with the right and left hand threads on said shaft and mounted on said shaft, cooperating object engaging means on said nuts, and means for holding said nuts against rotation while the shaft rotates whereby the nuts move toward each other on rotation of the shaft in one direction and away from each other on rotation of the shaft in the opposite direction, said nuts being made up of two segments which may be selectively engaged and disengaged from the screw, each nut including a cam shaft, extending transversely thereof and carrying spaced cam members operatively engaged respectively with the segments of the associated nut, and control rods operatively connected to the respective cam shafts to rock said shafts whereby the two segments of each nut may be selectively engaged with and disengaged from said shaft.

References Cited by the Examiner

UNITED STATES PATENTS

| 975,727 | 11/1910 | Smith. | |
|---|---|---|---|
| 1,035,886 | 8/1912 | Markus | 81—163 X |
| 1,271,811 | 7/1918 | Vincent et al. | 81—156 |
| 2,116,142 | 5/1938 | Chappell et al. | 74—56 |

GERALD M. FORLENZA, *Primary Examiner.*

HUGO O. SCHULZ, *Examiner.*

R. G. SHERIDAN, *Assistant Examiner.*